US012799282B2

(12) United States Patent
Satoh et al.

(10) Patent No.: US 12,799,282 B2
(45) Date of Patent: Nov. 17, 2026

(54) RESIN COMPOSITION FOR FORMING PHASE-SEPARATED STRUCTURE, METHOD OF PRODUCING STRUCTURE CONTAINING PHASE-SEPARATED STRUCTURE, AND BLOCK COPOLYMER

(71) Applicant: TOKYO OHKA KOGYO CO., LTD., Kawasaki (JP)

(72) Inventors: Toshifumi Satoh, Sapporo (JP); Takuya Isono, Sapporo (JP); Kazushige Suzuki, Sapporo (JP); Toi Iizuka, Sapporo (JP); Ken Miyagi, Kawasaki (JP); Takahiro Dazai, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 472 days.

(21) Appl. No.: 18/513,191

(22) Filed: Nov. 17, 2023

(65) Prior Publication Data

US 2024/0182701 A1 Jun. 6, 2024

(30) Foreign Application Priority Data

Nov. 22, 2022 (JP) ................................ 2022-186471

(51) Int. Cl.
*C08G 81/02* (2006.01)
*C08L 53/00* (2006.01)

(52) U.S. Cl.
CPC ........... *C08G 81/021* (2013.01); *C08G 81/02* (2013.01); *C08L 53/00* (2013.01); *C08L 53/005* (2013.01)

(58) Field of Classification Search
CPC .......... C08G 81/02; C08L 53/00; C08L 25/14
See application file for complete search history.

(56) References Cited

U.S. PATENT DOCUMENTS

| | | | | |
|---|---|---|---|---|
| 5,360,875 A * | 11/1994 | Masse | C08F 297/044 525/271 |
| 2014/0343192 A1* | 11/2014 | Cochran | C08F 242/00 525/286 |

FOREIGN PATENT DOCUMENTS

JP A-2008-036491 2/2008

OTHER PUBLICATIONS

"Precise Synthesis of Block Copolymers Composed of Three of More Blocks by Specially Designed Linking Methodologies in Conjunction with Living Anionic Polymerization System" authored by Matsuo et al. and published in Polymers (2013) 5, 1012-1040.*

William Hinsberg, et al., "Self-Assembling Materials for Lithographic Patterning: Overview, Status and Moving Forward", Proceedings of SPIE, vol. 7637, 76370G-1 to 76370G-11, 2010.

Kohei Yoshida et al., Installing a functional group into the inactive w-chain end of PMMA and PS-b-PMMA by terminal-selective transesterification, Polymer Chemistry, 2019, 3390-3398.

* cited by examiner

*Primary Examiner* — Marc S Zimmer
(74) *Attorney, Agent, or Firm* — Knobbe, Martens, Olson & Bear, LLP

(57) ABSTRACT

A resin composition for forming a phase-separated structure contains a block copolymer that is formed of a first block, a second block, and a third block, which are bonded to one another. The structure of a constituent unit of a polymer constituting the first block is identical to the structure of a constituent unit of a polymer constituting the third block. The number-average molecular weight (Mn3) of the polymer constituting the third block is smaller than the number-average molecular weight (Mn1) of the polymer constituting the first block.

7 Claims, 1 Drawing Sheet

RESIN COMPOSITION FOR FORMING PHASE-SEPARATED STRUCTURE, METHOD OF PRODUCING STRUCTURE CONTAINING PHASE-SEPARATED STRUCTURE, AND BLOCK COPOLYMER

BACKGROUND OF THE INVENTION

Field of the Invention

The present invention relates to a resin composition for forming a phase-separated structure, a method of producing a structure containing a phase-separated structure, and a block copolymer.

Priority is claimed on Japanese Patent Application No. 2022-186471, filed on Nov. 22, 2022, the content of which is incorporated herein by reference.

Description of Related Art

In recent years, as further miniaturization of large-scale integrated circuits (LSI) proceeds, a technology for processing a more delicate structure has been demanded.

In response to such a demand, there has been developed a technology for forming a finer pattern using a phase-separated structure formed by self-assembly of block copolymers having incompatible blocks bonded to each other (see, for example, Japanese Unexamined Patent Application, First Publication No. 2008-36491).

The block copolymer is separated (phase-separated) in micro regions due to repulsion between blocks incompatible with each other, and subjected to the heat treatment or other processing to form a structure containing a regular periodic structure. Specific examples of this periodic structure include a cylinder (columnar phase), a lamella (plate phase), a sphere (spherical phase), and other structures.

In order to utilize the phase-separated structure of the block copolymer, it is necessary to form a self-assembly nanostructure by a microphase separation only in a specific region and arrange the nanostructure in a desired direction. In order to achieve these position control and orientation control, processes such as graphoepitaxy to control a phase-separated pattern by a guide pattern and chemical epitaxy to control a phase-separated pattern by a difference in the chemical state of a substrate have been proposed (see, for example, Proceedings of SPIE, Vol. 7637, No. 76370G-1 (2010)).

SUMMARY OF THE INVENTION

In regard to a method of forming a pattern using a phase-separated structure formed by self-assembly of block copolymers, it is necessary to prepare a block copolymer with L0(=Mn) corresponding to one pitch. Therefore, it is necessary to prepare block copolymers individually for designing a plurality of pitches.

In the above-described pattern formation method, in a case where one block copolymer can be used for a plurality of pitches, the applicable range of the method of forming a pattern is greatly expanded.

Therefore, in the above-described method of forming a pattern, improvement of a process margin is required.

The present invention has been made in view of the above circumstances, and an object of the present invention is to provide a resin composition for forming a phase-separated structure capable of improving a process margin, a method of producing a structure containing a phase-separated structure produced by using the resin composition for forming a phase-separated structure, and a block copolymer useful as a resin component of the resin composition for forming a phase-separated structure.

A first aspect of the present invention is a resin composition for forming a phase-separated structure containing a block copolymer that is formed of a first block, a second block, and a third block, which are bonded to one another, and in the block copolymer, the structure of a constituent unit of a polymer constituting the first block is identical to the structure of a constituent unit of a polymer constituting the third block, and the number-average molecular weight (Mn3) of the polymer constituting the third block is smaller than the number-average molecular weight (Mn1) of the polymer constituting the first block.

A second aspect of the present invention is a method of producing a structure containing a phase-separated structure including a step of applying a resin composition for forming a phase-separated structure according to the first aspect on a support to form a layer containing a block copolymer, and a step of phase-separating the layer containing the block copolymer.

A third aspect of the present invention is a block copolymer that is formed of a first block, a second block, and a third block, which are bonded to one another, and in the block copolymer, the structure of a constituent unit of a polymer constituting the first block is identical to the structure of a constituent unit of a polymer constituting the third block, and the number-average molecular weight of the polymer constituting the third block is smaller than the number-average molecular weight of the polymer constituting the first block.

According to the present invention, an object of the present invention is to provide the resin composition for forming a phase-separated structure capable of improving a process margin, the method of producing a structure containing a phase-separated structure produced by using the resin composition for forming a phase-separated structure, and the block copolymer useful as a resin component of the resin composition for forming a phase-separated structure.

DETAILED DESCRIPTION OF THE INVENTION

Figure 1:
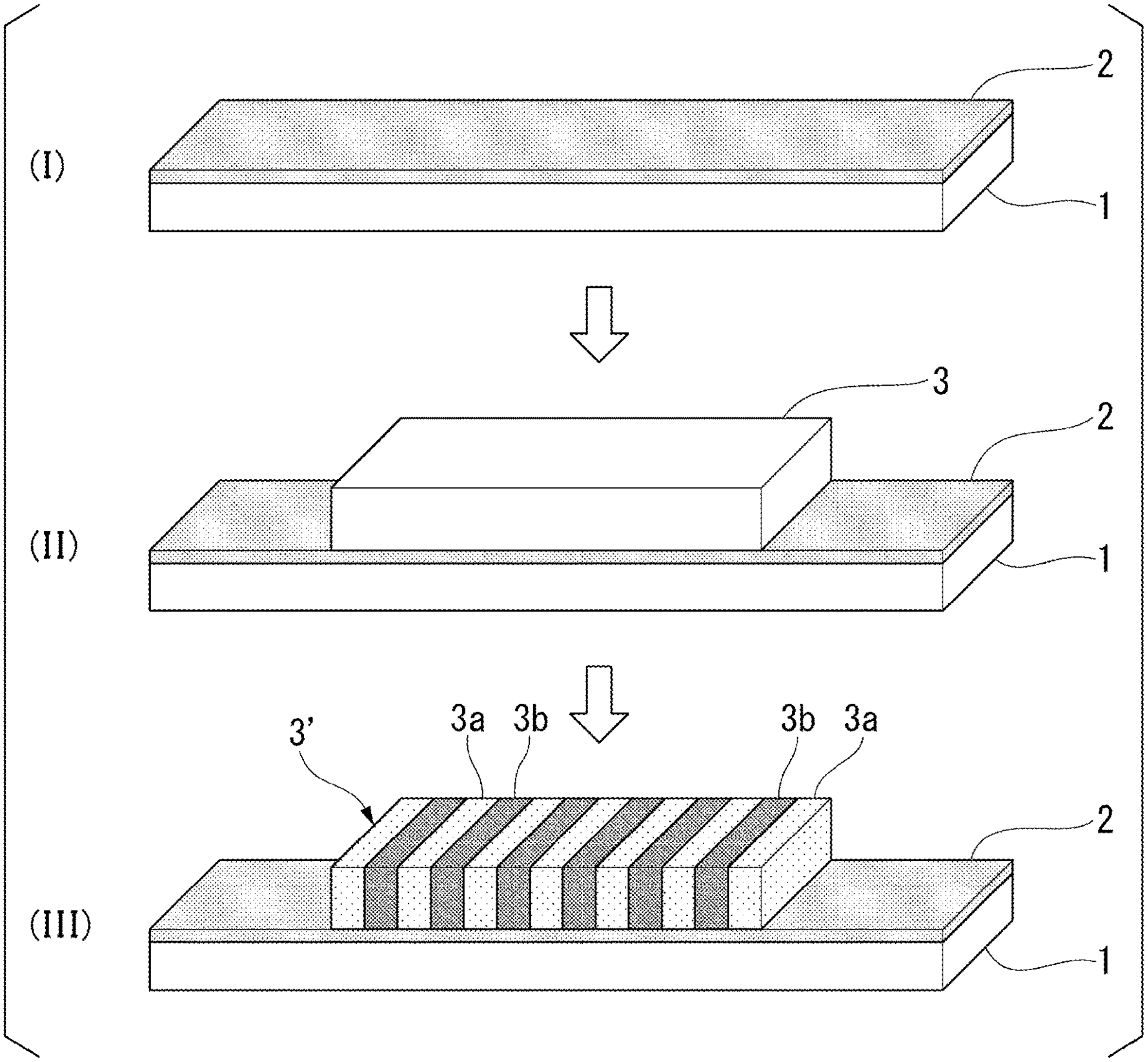
FIG. 1 is a schematic process diagram showing an example of an embodiment of a method of producing a structure containing a phase-separated structure.

In the present specification and claims, the term "aliphatic" is defined as a relative concept to aromatic, and means a group, a compound, and the like having no aromaticity.

Unless otherwise specified, the term "alkyl group" is intended to encompass linear, branched, and cyclic monovalent saturated hydrocarbon groups. The same applies to an alkyl group in an alkoxy group.

Unless otherwise specified, the term "alkylene group" is intended to encompass linear, branched, and cyclic divalent saturated hydrocarbon groups.

The term "halogenated alkyl group" is a group obtained by substituting all or some of hydrogen atoms in an alkyl group with a halogen atom, and examples of the halogen atom include a fluorine atom, a chlorine atom, a bromine atom, and an iodine atom.

The term "fluorinated alkyl group" or "fluorinated alkylene group" is a group obtained by substituting all or some of hydrogen atoms in an alkyl group or an alkylene group with a fluorine atom.

The term "constituent unit" means a monomer unit constituting a polymer compound (resin, polymer, and copolymer).

The phrase "constituent unit derived from" means a constituent unit that is formed by the cleavage of an ethylenic double bond.

The case where it is described as "which may have a substituent" includes both a case where a hydrogen atom (—H) is substituted with a monovalent group and a case where a methylene group ($—CH_2—$) is substituted with a divalent group.

The term "exposure" is a concept including general irradiation with radiation.

The term "α-position (carbon atom at α-position)" means a carbon atom to which a side chain of a block copolymer is bonded, unless otherwise specified. The "carbon atom at the α-position" of a methyl methacrylate unit means a carbon atom to which a carbonyl group of methacrylic acid is bonded. The "carbon atom at the α-position" of a styrene unit means a carbon atom to which a benzene ring is bonded.

The term "number-average molecular weight" (Mn) is the number-average molecular weight in terms of standard polystyrene measured by size-exclusion chromatography, unless otherwise specified.

The term "weight-average molecular weight" (Mw) is a weight-average molecular weight in terms of standard polystyrene measured by size-exclusion chromatography, unless otherwise specified. A value of adding a unit (gmol) to the value of Mn or Mw represents a molar mass.

In the present specification and claims, an asymmetric carbon may be present depending on the structure represented by a chemical formula, and an enantiomer or a diastereomer may be present. In those cases, these isomers are represented by one formula. These isomers may be used alone or used as a mixture.

In the present specification, the term "period of structure" means a period of a phase structure observed when the structure of a phase-separated structure is formed and refers to the sum of lengths of the phases each of which is incompatible. In a case where the phase-separated structure forms a cylinder structure perpendicular to a surface of a substrate, a period (L0) of the structure is a distance (pitch) between centers of two adjacent cylinder structures.

It is known that the period (L0) of the structure is determined by inherent polymerization properties such as the degree of polymerization N and interaction parameter $\chi$ of Flory-Huggins. That is, the larger the product "$\chi \times N$" of $\chi$ and N is, the greater the interactive repulsion between the different blocks in the block copolymer becomes. Therefore, in a case of the relation of $\chi \times N > 10.5$ (hereinafter, referred to as "strong separation limit"), the repulsion between the different kinds of blocks in the block copolymer is large, and the tendency for phase separation to occur becomes strong. Accordingly, in the strong separation limit, the period of the structure is approximately $N^{2/3} \times \chi^{1/6}$, and satisfies the relationship of the following equation (cy). That is, the period of the structure is proportional to the degree of polymerization N, which correlates with the molecular weight and the molecular weight ratio between the different blocks.

$$L0 \propto a \times N^{2/3} \times \chi^{1/6} \ldots (cy)$$

[In expression, L0 represents a period of the structure. a is a parameter indicating the size of the monomer. N represents a degree of polymerization. $\chi$ is an interaction parameter, and the higher the value thereof, the higher the phase separation performance.]

Accordingly, the period (L0) of the structure can be controlled by adjusting the composition and the total molecular weight of the block copolymer.

(Resin Composition for Forming Phase-separated Structure)

A resin composition for forming a phase-separated structure according to the present embodiment contains a block copolymer that is formed of a first block, a second block, and a third block, which are bonded to one another, and in the block copolymer, the structure of a constituent unit of a polymer constituting the first block is identical to the structure of a constituent unit of a polymer constituting the third block, and the number-average molecular weight (Mn3) of the polymer constituting the third block is smaller than the number-average molecular weight (Mn1) of the polymer constituting the first block.

<Block Copolymer>

In the block copolymer, it is preferable that the first block, the second block, and the third block are bonded in this order, and more preferable that the first block, the second block, and the third block are bonded in this order, and the third block is bonded to a side chain of the second block via a linking group.

The block copolymer may contain a block other than the first block, the second block, and the third block.

In the block copolymer, the structure of the constituent unit of the polymer constituting the first block is identical to the structure of the constituent unit of the polymer constituting the third block, and the number-average molecular weight (Mn3) of the polymer constituting the third block (hereinbelow, simply referred to as "Mn3") is smaller than the number-average molecular weight (Mn1) of the polymer constituting the first block (hereinbelow, simply referred to as "Mn1").

More specifically, Mn1:Mn3 is preferably 1:0.05 to 1:0.35, more preferably 1:0.06 to 1:0.35, and still more preferably 1:0.07 to 1:0.35.

In a case where Mn3 with respect to Mn1 is the above-described preferred lower limit or more, the process margin is further improved.

In addition, in a case where Mn3 with respect to Mn1 is the above-described preferred upper limit or less, the thermal motility is appropriately maintained, and the occurrence of defects can be further suppressed.

Here, "defects" refer to general defects detected when a pattern is observed from directly above. Examples of these defects include a defect occurring due to the adhesion of foreign substances or precipitates to a surface of the pattern, a defect regarding a pattern shape such as bridges between patterns or hole filling in patterns, and a dislocation defect peculiar to directed self-assembly (DSA) lithography.

Specifically, Mn1 is preferably 10,000 to 100,000, more preferably 15,000 to 50,000, and still more preferably 18,000 to 40,000.

In a case where Mn1 is within the above-described preferable range, the process margin is more likely to be improved, and the occurrence of defects is more easily suppressed.

Specifically, Mn3 is preferably 1,200 to 11,500, more preferably 1,500 to 11,000, and still more preferably 1,800 to 10,500.

In a case where Mn3 is the above-described preferred lower limit or more, the period (L0) of the structure can be made smaller, and a finer pattern can be formed.

In addition, in a case where Mn3 is the above-described preferred upper limit or less, the thermal motility is appropriately maintained, and the occurrence of defects can be further suppressed.

In the block copolymer, a mass ratio of the first block and third block to the second block (a content of the first block and third block:a content of the second block) is 25:75 to 75:25, more preferably 30:70 to 70:30, and still more preferably 40:60 to 60:40.

In a case where (the content of the first block and third block: the content of the second block) of the block copolymer is within the above-described preferable range, a lamella phase-separated structure oriented in a direction perpendicular to the surface of the support can be more easily obtained by the resin composition for forming a phase-separated structure of the present embodiment. In addition, the process margin during the formation of the structure can be further improved and the occurrence of defects can be further suppressed.

The mass ratio of the first block and third block to the second block (the content of the first block and third block:the content of the second block) can be calculated by $^1$H-NMR.

Mn1, Mn2, and Mn3 of the block copolymer can be calculated by, for example, the following methods.

For example, in a case where the block copolymer is PS-b-PMMA-b-PS', and PS' is bonded to a side chain of PMMA, PS-b-PMMA and PS' can be separated from each other by hydrolysis. Mn3 can be calculated for the polymer PS' constituting the third block by size-exclusion chromatography. In addition, the number-average molecular weight Mn12 of the block copolymer containing the first block and the second block can also be calculated. Regarding the block copolymer containing the first block and the second block, a ratio between a polymer constituting the first block and a polymer constituting the second block in the block copolymer can be calculated by $^1$H-NMR. Thus, Mn1 and Mn2 can be calculated from Mn12 described above.

In addition, in a case where the number-average molecular weight (Mn) of the block copolymer and the constituent unit of the polymer constituting each block are known through 1H-NMR, Mn1, Mn2, and Mn3 can also be calculated from a relationship of L0.

The number-average molecular weight (Mn) of the block copolymer is preferably 20,000 to 200,000, more preferably 30,000 to 100,000, and still more preferably 36,000 to 80,000.

In a case where the number-average molecular weight (Mn) of the block copolymer is within the above-described preferable range, the process margin is more likely to be improved, and the occurrence of defects is more easily suppressed.

The dispersity (Mw/Mn) of the block copolymer is preferably 1.0 to 3.0, more preferably 1.0 to 1.5, and still more preferably 1.0 to 1.3.

Examples of the block copolymer include a block copolymer that is formed by bonding a plurality of blocks composed of constituent units containing an aromatic hydrocarbon group and a block composed of a constituent unit derived from an (α-substituted) acrylic acid ester: a block copolymer that is formed by bonding a plurality of blocks composed of constituent units containing an aromatic hydrocarbon group and a block composed of a constituent unit derived from an (α-substituted) acrylic acid; a block copolymer that is formed by bonding a plurality of blocks composed of constituent units containing an aromatic hydrocarbon group and a block composed of a constituent unit derived from siloxane or a derivative thereof; a block copolymer that is formed by bonding a plurality of blocks composed of constituent units derived from alkylene oxide and a block composed of a constituent unit derived from an (α-substituted) acrylic acid ester: a block copolymer that is formed by bonding a plurality of blocks composed of constituent units derived from alkylene oxide and a block composed of a constituent unit derived from an (α-substituted) acrylic acid: a block copolymer that is formed by bonding a plurality of blocks composed of cage silsesquioxane structure-containing constituent units and a block composed of a constituent unit derived from an (α-substituted) acrylic acid ester: a block copolymer that is formed by bonding a plurality of blocks composed of cage silsesquioxane structure-containing constituent units and a block composed of a constituent unit derived from an (α-substituted) acrylic acid; a block copolymer that is formed by bonding a plurality of blocks composed of cage silsesquioxane structure-containing constituent units and a block composed of a constituent unit derived from siloxane or a derivative thereof, and other block copolymers.

<<Constituent Unit Containing Aromatic Hydrocarbon Group>>

In a constituent unit containing an aromatic hydrocarbon group, the aromatic hydrocarbon group is a hydrocarbon group containing at least one aromatic ring.

This aromatic ring is not limited as long as it is a cyclic conjugated system having (4n+2) π electrons, and may be an aromatic heterocyclic ring obtained by substituting some of carbon atoms, which constitute an aromatic hydrocarbon ring, with heteroatoms.

Specific examples of the aromatic hydrocarbon group in the constituent unit containing the aromatic hydrocarbon group include a phenyl group and a naphthyl group.

Among these, as the constituent unit containing an aromatic hydrocarbon group, a constituent unit derived from styrene, a derivative of the styrene, 1-vinylnaphthalene, 4-vinylbiphenyl, 1-vinyl-2-pyrrolidone, 9-vinylanthracene, or vinylpyridine is preferred, and a constituent unit derived from styrene or a derivative of the styrene is more preferred. Specific examples of styrene or a derivative of the styrene include α-methylstyrene, 2-methylstyrene, 3-methylstyrene, 4-methylstyrene, 4-t-butylstyrene, 4-n-octylstyrene, 2,4,6-trimethylstyrene, 4-methoxystyrene, 4-t-butoxystyrene, 4-hydroxystyrene, 4-nitrostyrene, 3-nitrostyrene, 4-chlorostyrene, 4-fluorostyrene, 4-acetoxyvinyl styrene, 4-chloromethylstyrene, and the like.

<<Constituent Unit Derived from (α-Substituted) Acrylic Acid Ester>>

In the present specification, the term "(α-substituted) acrylic acid ester" encompasses an acrylic acid ester and an acrylic acid ester obtained by substituting a hydrogen atom bonded to a carbon atom at an α-position with a substituent.

Specific examples of the (α-substituted) acrylic acid ester include acrylic acid esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate: and methacrylic acid esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxy-cyclohexylmethane methacrylate, and propyltrimethoxysilane methacrylate.

Among these, as the (α-substituted) acrylic acid ester, methyl acrylate, ethyl acrylate, t-butyl acrylate, methyl methacrylate, ethyl methacrylate, and t-butyl methacrylate are preferred, and methyl methacrylate is more preferred.

<<Constituent Unit Derived from (α-Substituted) Acrylic Acid>>

In the present specification, the term "(α-substituted) acrylic acid" encompasses an acrylic acid and an acrylic acid obtained by substituting a hydrogen atom bonded to a carbon atom at an α-position with a substituent.

Specific examples of the (α-substituted) acrylic acid include acrylic acid and methacrylic acid.

<<Constituent Unit Derived from Constituent Unit Derived from Siloxane or Derivative thereof>>

Specific examples of siloxane or a derivative thereof include dimethylsiloxane, diethylsiloxane, diphenylsiloxane, methylphenylsiloxane, and the like.

<<Constituent Unit Derived from Constituent Unit Derived from Alkylene Oxide>>

Specific examples of the alkylene oxide include ethylene oxides, propylene oxides, isopropylene oxides, and butylene oxides.

<<Constituent Unit Derived from Cage Silsesquioxane Structure-Containing Constituent Unit>>

Examples of the cage silsesquioxane (polyhedral oligomeric silsesquioxanes, POSS) structure-containing constituent unit include a constituent unit represented by General Formula (a0-1).

(a 0-1)

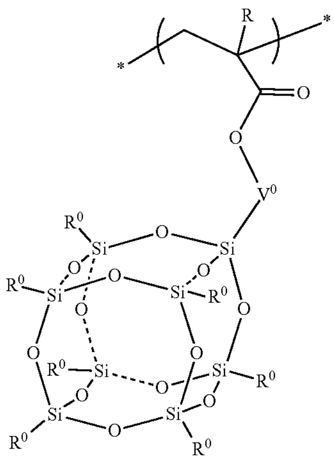

[In the formula, R represents a hydrogen atom, an alkyl group having 1 to 5 carbon atoms, or a halogenated alkyl group having 1 to 5 carbon atoms, $V^0$ represents a divalent hydrocarbon group which may have a substituent, $R^0$ represents a monovalent hydrocarbon group which may have a substituent, and a plurality of $R^0$'s may be the same as or different from each other. * represents a bond.]

In Formula (a0-1), as the alkyl group having 1 to 5 carbon atoms as R, a linear or branched alkyl group having 1 to 5 carbon atoms is preferable, and specific examples thereof include a methyl group, an ethyl group, a propyl group, an isopropyl group, an n-butyl group, an isobutyl group, a tert-butyl group, a pentyl group, an isopentyl group, and a neopentyl group. The halogenated alkyl group having 1 to 5 carbon atoms is a group obtained by substituting all or some of hydrogen atoms in the alkyl group having 1 to 5 carbon atoms with a halogen atom. Examples of the halogen atom include a fluorine atom, a chlorine atom, a bromine atom, and an iodine atom, and among these, a fluorine atom is particularly preferable.

R is preferably a hydrogen atom, an alkyl group having 1 to 5 carbon atoms, or a fluorinated alkyl group having 1 to 5 carbon atoms, and most preferably a hydrogen atom or a methyl group in terms of industrial availability.

In Formula (a0-1), the monovalent hydrocarbon group as $R^0$ preferably has 1 to 20 carbon atoms, more preferably has 1 to 10 carbon atoms, and still more preferably has 1 to 8 carbon atoms. Here, the number of carbon atoms thereof does not include the number of carbon atoms in a substituent described later.

The monovalent hydrocarbon group as $R^0$ may be an aliphatic hydrocarbon group or an aromatic hydrocarbon group. Among these, an aliphatic hydrocarbon group is preferred, and a monovalent aliphatic saturated hydrocarbon group (alkyl group) is more preferred.

More specific examples of the alkyl group include a chain-like aliphatic hydrocarbon group (linear or branched alkyl group) and an aliphatic hydrocarbon group containing a ring in the structure thereof.

The linear alkyl group preferably has 1 to 8 carbon atoms, more preferably has 1 to 5 carbon atoms, and still more preferably has 1 to 3 carbon atoms. Specific examples thereof include a methyl group, an ethyl group, an n-propyl group, an isopropyl group, an n-butyl group, an isobutyl group, and an n-pentyl group. Among these, a methyl group, an ethyl group, or an n-propyl group is preferred, a methyl group, an ethyl group, or an isobutyl group is more preferred, an ethyl group or an isobutyl group is still more preferred, and an ethyl group is particularly preferred.

The branched alkyl group preferably has 3 to 5 carbon atoms. Specific examples thereof include an isopropyl group, an isobutyl group, a tert-butyl group, an isopentyl group, and a neopentyl group, and an isopropyl group or a tert-butyl group is most preferable.

Examples of the aliphatic hydrocarbon group containing a ring in the structure thereof include a cyclic aliphatic hydrocarbon group (a group obtained by removing one hydrogen atom from an aliphatic hydrocarbon ring), a group containing the cyclic aliphatic hydrocarbon group that is bonded to the terminal of the aforementioned chain-like aliphatic hydrocarbon group, or a group containing the cyclic aliphatic hydrocarbon group that is interposed within the aforementioned chain-like aliphatic hydrocarbon group.

The cyclic aliphatic hydrocarbon group preferably has 3 to 8 carbon atoms and more preferably has 4 to 6 carbon atoms, and may be a polycyclic group or a monocyclic group. The monocyclic group is preferably a group obtained by removing one or more hydrogen atoms from a monocycloalkane having 3 to 6 carbon atoms, and examples of the monocycloalkane include cyclopentane, cyclohexane, and the like. The polycyclic group is preferably a group obtained by removing one or more hydrogen atoms from a polycycloalkane having 7 to 12 carbon atoms, and specific examples the polycycloalkane include adamantane, norbornane, isobornane, tricyclodecane, tetracyclododecane, and the like.

The chain-like aliphatic hydrocarbon group may have a substituent. Examples of the substituent include a fluorine atom, a fluorinated alkyl group having 1 to 5 carbon atoms, which is obtained by the substitution with a fluorine atom, and an oxygen atom (=O).

The cyclic aliphatic hydrocarbon group may have a substituent. Examples of the substituent include an alkyl group having 1 to 5 carbon atoms, a fluorine atom, a fluorinated alkyl group having 1 to 5 carbon atoms, an oxygen atom (=O), and the like.

In a case where the monovalent hydrocarbon group as $R^0$ is an aromatic hydrocarbon group, the aromatic hydrocarbon group is a monovalent hydrocarbon group having at least one aromatic ring.

The aromatic ring is not particularly limited as long as it is a cyclic conjugated system having (4n+2) π electrons, and may be monocyclic or polycyclic. The number of carbon atoms in the aromatic ring is preferably 5 to 30, more preferably 5 to 20, still more preferably 6 to 15, and particularly preferably 6 to 12. Here, the number of carbon atoms thereof does not include the number of carbon atoms in a substituent described later.

Specific examples of the aromatic ring include aromatic hydrocarbon rings such as benzene, naphthalene, anthracene, and phenanthrene; and an aromatic heterocyclic ring obtained by substituting some of carbon atoms constituting the above-described aromatic hydrocarbon ring with a heteroatom. Examples of the heteroatom in the aromatic heterocyclic ring include an oxygen atom, a sulfur atom, and a nitrogen atom. Specific examples of the aromatic heterocyclic ring include a pyridine ring and a thiophene ring.

Specific examples of the aromatic hydrocarbon group include a group obtained by removing one hydrogen atom from the above-described aromatic hydrocarbon ring or aromatic heterocyclic ring (an aryl group or a heteroaryl group); a group obtained by removing one hydrogen atom from an aromatic compound having two or more aromatic rings (biphenyl, fluorene or the like); and a group obtained by substituting one hydrogen atom of the above-described aromatic hydrocarbon ring or aromatic heterocyclic ring with an alkylene group (for example, an arylalkyl group such as a benzyl group, a phenethyl group, a 1-naphthylmethyl group, a 2-naphthylmethyl group, a 1-naphthylethyl group, or a 2-naphthylethyl group). The number of carbon atoms in the alkylene group which is bonded to the above-described aryl group or heteroaryl group is preferably 1 to 4, more preferably 1 or 2, and particularly preferably 1. The aromatic hydrocarbon group may or may not have a substituent. Examples of the substituent include an alkyl group having 1 to 5 carbon atoms, a fluorine atom, a fluorinated alkyl group having 1 to 5 carbon atoms, which is obtained by the substitution with a fluorine atom, an oxygen atom (=O), and other substituents.

In Formula (a0-1), the divalent hydrocarbon group as $V^0$ may be an aliphatic hydrocarbon group or an aromatic hydrocarbon group. The aliphatic hydrocarbon group means a hydrocarbon group that has no aromaticity.

The aliphatic hydrocarbon group as the divalent hydrocarbon group represented by $V^0$ may be saturated or unsaturated. In general, it is preferable that the aliphatic hydrocarbon group is saturated.

More specifically, as the aliphatic hydrocarbon group, a linear or branched aliphatic hydrocarbon group and an aliphatic hydrocarbon group including a ring in the structure thereof are exemplary examples.

The linear or branched aliphatic hydrocarbon group has preferably 1 to 10 carbon atoms, more preferably 1 to 6 carbon atoms, still more preferably 1 to 4 carbon atoms, and most preferably 1 to 3 carbon atoms.

The linear aliphatic hydrocarbon group is preferably a linear alkylene group, and specific examples thereof include a methylene group [$-CH_2-$], an ethylene group [$-(CH_2)_2-$], a trimethylene group [$-(CH_2)_3-$], a tetramethylene group [$-(CH_2)_4-$], and a pentamethylene group [$-(CH_2)_5-$].

As the branched aliphatic hydrocarbon group, a branched alkylene group is preferable. Specifically, alkylalkylene groups, for example, alkylmethylene groups such as $-CH(CH_3)-$, $-CH(CH_2CH_3)-$, $-C(CH_3)_2-$, $-C(CH_3)(CH_2CH_3)-$, $-C(CH_3)(CH_2CH_2CH_3)-$, and $-C(CH_2CH_3)_2-$; alkylethylene groups such as $-CH(CH_3)CH_2-$, $-CH(CH_3)CH(CH_3)-$, $-C(CH_3)_2CH_2-$, $-CH(CH_2CH_3)CH_2-$, and $-C(CH_2CH_3)_2-CH_2-$; alkyltrimethylene groups such as $-CH(CH_3)CH_2CH_2-$, and $-CH_2CH(CH_3)CH_2-$; and alkyltetramethylene groups such as $-CH(CH_3)CH_2CH_2CH_2-$ and $-CH_2CH(CH_3)CH_2CH_2-$ are exemplary examples. As an alkyl group in the alkylalkylene group, a linear alkyl group having 1 to 5 carbon atoms is preferable.

Examples of the aliphatic hydrocarbon group containing a ring in the structure thereof include an alicyclic hydrocarbon group (a group obtained by removing two hydrogen atoms from an aliphatic hydrocarbon ring), a group in which the alicyclic hydrocarbon group is bonded to the terminal of the linear or branched aliphatic hydrocarbon group, and a group in which the alicyclic hydrocarbon group is interposed in the linear or branched aliphatic hydrocarbon group. Examples of the linear or branched aliphatic hydrocarbon group include the same ones as those described above.

The number of carbon atoms in the alicyclic hydrocarbon group is preferably 3 to 20 and more preferably 3 to 12.

The alicyclic hydrocarbon group may be a polycyclic group or a monocyclic group. As the monocyclic alicyclic hydrocarbon group, a group formed by removing two hydrogen atoms from a monocycloalkane is preferable. The number of carbon atoms in the monocycloalkane is preferably 3 to 6, and specifically, cyclopentane and cyclohexane are exemplary examples.

As the polycyclic alicyclic hydrocarbon group, a group formed by removing two hydrogen atoms from a polycycloalkane is preferable. The number of carbon atoms in the polycycloalkane is preferably 7 to 12, and specifically, adamantane, norbornane, isobornane, tricyclodecane, and tetracyclododecane are exemplary examples.

The aromatic hydrocarbon group is a hydrocarbon group having an aromatic ring.

The aromatic ring is not particularly limited as long as it is a cyclic conjugated system having (4n+2) π electrons, and may be monocyclic or polycyclic. The number of carbon atoms in the aromatic ring is preferably 5 to 30, more preferably 5 to 20, still more preferably 6 to 15, and particularly preferably 6 to 12. Here, the number of carbon atoms thereof does not include the number of carbon atoms in a substituent described later.

Specific examples of the aromatic ring include aromatic hydrocarbon rings such as benzene, naphthalene, anthracene, and phenanthrene; and an aromatic heterocyclic ring obtained by substituting some of carbon atoms constituting the above-described aromatic hydrocarbon ring with a heteroatom. Examples of the heteroatom in the aromatic heterocyclic ring include an oxygen atom, a sulfur atom, and a nitrogen atom. Specific examples of the aromatic heterocyclic ring include a pyridine ring and a thiophene ring.

Specific examples of the aromatic hydrocarbon group include a group obtained by removing two hydrogen atoms have been removed from the above-described aromatic hydrocarbon ring or aromatic heterocyclic ring (an arylene group or a heteroarylene group); a group in which two hydrogen atoms have been removed from an aromatic compound having two or more aromatic rings (such as biphenyl or fluorene); and a group in which one hydrogen atom of a group (an aryl group or a heteroaryl group) obtained by removing one hydrogen atom from the above-described aromatic hydrocarbon ring or aromatic heterocyclic ring has been substituted with an alkylene group (for example, a group obtained by further removing one hydrogen atom from an aryl group in arylalkyl groups such as a benzyl group, a phenethyl group, a 1-naphthylmethyl group, a 2-naphthylmethyl group, a 1-naphthylethyl group, or a 2-naphthylethyl group).

The number of carbon atoms in the alkylene group which is bonded to the above-described aryl group or heteroaryl group is preferably 1 to 4, more preferably 1 or 2, and particularly preferably 1.

Specific examples of the constituent unit represented by General Formula (a0-1) are shown below. In each of the formulae shown below, $R^{\alpha}$ represents a hydrogen atom, a methyl group, or a trifluoromethyl group.

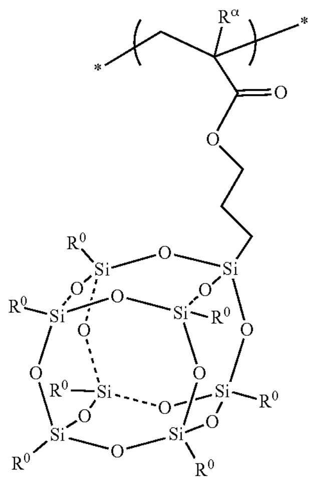

$R^0$ = ethyl group or isobutyl group

More specific examples of the block copolymer include a block copolymer that has a plurality of blocks composed of constituent units derived from styrene and a block composed of a constituent unit derived from methyl acrylate: a block copolymer that has a plurality of blocks composed of constituent units derived from styrene and a block composed of a constituent unit derived from ethyl acrylate; a block copolymer that has a plurality of blocks composed of constituent units derived from styrene and a block composed of a constituent unit derived from t-butyl acrylate: a block copolymer that has a plurality of blocks composed of constituent units derived from styrene and a block composed of a constituent unit derived from methyl methacrylate; a block copolymer that has a plurality of blocks composed of constituent units derived from styrene and a block composed of a constituent unit derived from ethyl methacrylate: a block copolymer that has a plurality of blocks composed of constituent units derived from styrene and a block composed of a constituent unit derived from t-butyl methacrylate; a block copolymer that has a plurality of blocks composed of cage silsesquioxane (POSS) structure-containing constituent units and a block composed of a constituent unit derived from methyl acrylate, and other block copolymers.

Among these, as the block copolymer, the first block and the third block are preferably composed of a polymer having a repeating structure composed of a constituent unit containing an aromatic hydrocarbon group, and the second block is preferably composed of a polymer having a repeating structure composed of a constituent unit derived from an (α-substituted) acrylic acid ester.

That is, a block copolymer that has a plurality of blocks composed of constituent units derived from styrene and a block composed of a constituent unit derived from methyl acrylate: a block copolymer that has a plurality of blocks composed of constituent units derived from styrene and a block composed of a constituent unit derived from ethyl acrylate: a block copolymer that has a plurality of blocks composed of constituent units derived from styrene and a block composed of a constituent unit derived from t-butyl acrylate: a block copolymer that has a plurality of blocks composed of constituent units derived from styrene and a block composed of a constituent unit derived from methyl methacrylate: a block copolymer that has a plurality of blocks composed of constituent units derived from styrene and a block composed of a constituent unit derived from ethyl methacrylate: and a block copolymer that has a plurality of blocks composed of constituent units derived from styrene and a block composed of a constituent unit derived from t-butyl methacrylate are preferred, and a block copolymer that has a plurality of blocks composed of constituent units derived from styrene and a block composed of a constituent unit derived from methyl methacrylate is more preferred.

Among these, it is preferable that the block copolymer is formed of the first block and third block, which are composed of a polymer having a repeating structure composed of a constituent unit represented by General Formula (u1), and the second block, which is composed of a polymer having a repeating structure composed of a constituent unit represented by Formula (u2), and has the terminal of the main chain on the second block side, which is a terminal structure represented by General Formula (e1).

Furthermore, both the first block and third block have a repeating structure composed of the constituent unit represented by General Formula (u1), but have the different number of the repeating units, and the number of the repeating units in the third block is smaller than that of the first block (Mn3 is smaller than Mn1).

(u 1)

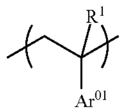

[In the formula, $R^1$ represents a hydrogen atom, an alkyl group having 1 to 5 carbon atoms, or a halogenated alkyl group having 1 to 5 carbon atoms. $Ar^{01}$ represents an aromatic hydrocarbon group.]

(u 2)

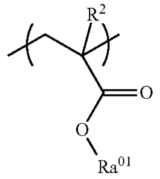

[In the formula, $R^2$ represents a hydrogen atom, an alkyl group having 1 to 5 carbon atoms, or a halogenated alkyl group having 1 to 5 carbon atoms. $Ra^{01}$ represents an alkyl group having 1 to 10 carbon atoms.]

(e 1)

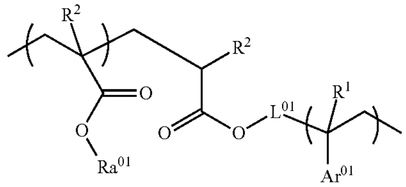

[In the formula, $R^1$ and $R^2$ each independently represent a hydrogen atom, an alkyl group having 1 to 5 carbon atoms, or a halogenated alkyl group having 1 to 5 carbon atoms. $Ra^{01}$ represents an alkyl group having 1 to 10 carbon atoms. $Ar^{01}$ represents an aromatic hydrocarbon group. $L^{01}$ represents a divalent linking group.]

[Constituent Unit Represented by General Formula (u1)]

In General Formula (u1), $R^1$ is a hydrogen atom, an alkyl group having 1 to 5 carbon atoms, or a halogenated alkyl group having 1 to 5 carbon atoms, and preferably a hydrogen atom.

In General Formula (u1), $Ar^{01}$ is an aromatic hydrocarbon group, and examples thereof include the same groups as the aromatic hydrocarbon groups in <<Constituent Unit Containing Aromatic Hydrocarbon Group>> described above.

Among these, $Ar^{01}$ is preferably a phenyl group.

[Constituent Unit Represented by General Formula (u2)]

In General Formula (u2), $R^2$ is a hydrogen atom, an alkyl group having 1 to 5 carbon atoms, or a halogenated alkyl group having 1 to 5 carbon atoms, and preferably an alkyl group having 1 to 5 carbon atoms, and more preferably a methyl group.

In General Formula (u2), $Ra^{01}$ is the alkyl group having 1 to 10 carbon atoms, preferably a linear or branched alkyl group having 1 to 5 carbon atoms, more preferably a methyl group, an ethyl group, a propyl group, an isopropyl group, an n-butyl group, an isobutyl group, a tert-butyl group, a pentyl group, an isopentyl group, or a neopentyl group, and still more preferably a methyl group.

[Terminal Structure Represented by General Formula (e1)]

In General Formula (e1), $R^1$ and $R^2$ are the same as $R^1$ in General Formula (u1) and $R^2$ in General Formula (u2) respectively.

$Ra^{01}$ in General Formula (e1) is the same as $Ra^{01}$ in General Formula (u2).

$Ar^{01}$ in General Formula (e1) is the same as $Ar^{01}$ in General Formula (u1).

$L^{01}$ in General Formula (e1) is a divalent linking group, and preferably an alkylene group having 1 to 10 carbon atoms.

Specific examples of the alkylene group having 1 to 10 carbon atoms include linear alkylene groups such as a methylene group [$-CH_2-$], an ethylene group [$-(CH_2)_2-$], a trimethylene group [$-(CH_2)_3-$], a tetramethylene group [$-(CH_2)_4-$], a pentamethylene group [$-(CH_2)_5-$]; branched alkylene groups such as alkylalkylene groups such as an alkylmethylene group such as $-CH(CH_3)-$, $-CH(CH_2CH_3)-$, $-C(CH_3)_2-$, $-C(CH_3)(CH_2CH_3)-$, $-C(CH_3)(CH_2CH_2CH_3)-$, or $-C(CH_2CH_3)_2-$, an alkylethylene group such as $-CH(CH_3)CH_2-$, $-CH(CH_3)CH(CH_3)-$, $-C(CH_3)_2CH_2-$, $-CH(CH_2CH_3)CH_2-$, or $-C(CH_2CH_3)-CH_2-$, an alkyltrimethylene group such as $-CH(CH_3)CH_2CH_2-$ or $-CH_2CH(CH_3)CH_2-$, an alkyltetramethylene group such as $-CH(CH_3)CH_2CH_2CH_2-$ or $-CH_2CH(CH_3)CH_2CH_2-$.

Among these, $L^{01}$ in General Formula (e1) is preferably a linear alkylene group having 1 to 10 carbon atoms, more preferably a linear alkylene group having 1 to 5 carbon atoms, and still more preferably a linear alkylene group having 2 to 5 carbon atoms.

<Organic Solvent Component>

The resin composition for forming a phase-separated structure of the present embodiment can be prepared by dissolving the above-described block copolymer in an organic solvent component.

Any organic solvent component may be used as long as it can dissolve each component to be used and form a homogeneous solution, and arbitrary solvents may be selected from any solvents known in the related art as a solvent for a composition containing a resin as a main component.

Exemplary examples of the organic solvent component include lactones such as γ-butyrolactone; ketones such as acetone, methyl ethyl ketone, cyclohexanone, methyl-n-pentyl ketone, methyl isopentyl ketone, and 2-heptanone; polyhydric alcohols such as ethylene glycol, diethylene glycol, propylene glycol, and dipropylene glycol; a compound having an ester bond such as ethylene glycol monoacetate, diethylene glycol monoacetate, propylene glycol monoacetate, and dipropylene glycol monoacetate; monoalkyl ether of the polyhydric alcohols or the compounds having the ester bond, such as monomethyl ether, monoethyl ether, monopropyl ether, monobutyl ether, or derivatives of polyhydric alcohols such as the compounds having an ether bond, such as monophenyl ether [among these, propylene glycol monomethyl ether acetate (PGMEA) and propylene glycol monomethyl ether (PGME) are preferable]; cyclic ethers such as dioxane, or esters such as methyl lactate, ethyl lactate (EL), methyl acetate, ethyl acetate, butyl acetate, methyl pyruvate, ethyl pyruvate, methyl methoxy propionate, and ethyl ethoxy propionate; and aromatic organic solvents such as anisole, ethyl benzyl ether, cresyl methyl ether, diphenyl ether, dibenzyl ether, phenetole, butyl phenyl ether, ethyl benzene, diethyl benzene, pentyl benzene, isopropyl benzene, toluene, xylene, cymene, and mesitylene.

The organic solvent component may be used alone or two or more kinds thereof may be used as a mixed solvent. Among these, propylene glycol monomethyl ether acetate (PGMEA), propylene glycol monomethyl ether (PGME), cyclohexanone, and EL are preferable.

A mixed solvent obtained by mixing PGMEA and a polar solvent is also preferable. The blending ratio (mass ratio) may be appropriately determined in consideration of compatibility between PGMEA and the polar solvent, and it is preferably in a range of 1:9 to 9:1 and more preferably 2:8 to 8:2.

For example, in a case where EL is blended as a polar solvent, the mass ratio of PGMEA:EL is preferably 1:9 to 9:1 and more preferably 2:8 to 8:2. In a case where PGME is blended as the polar solvent, the mass ratio of PGMEA: PGME is preferably 1:9 to 9:1, more preferably 2:8 to 8:2, and even more preferably 3:7 to 7:3. In a case where PGME and cyclohexanone are blended as a polar solvent, the mass ratio of PGMEA:(PGME+cyclohexanone) is preferably 1:9 to 9:1, more preferably 2:8 to 8:2, and even more preferably 3:7 to 7:3.

As the organic solvent component in the resin composition for forming a phase-separated structure, in addition to those components, a mixed solvent in which PGMEA, EL, or the mixed solvent of PGMEA and a polar solvent is mixed with γ-butyrolactone is also preferable. In this case, the mass ratio of the former to the latter is, as the mixing ratio, preferably 70:30 to 95:5.

The concentration of the organic solvent component included in the resin composition for forming a phase-separated structure is not particularly limited, and the component is appropriately set at a concentration with which the coating can be performed according to the coating film thickness. The solid content concentration is generally used in a range of 0.2% to 70% by mass and preferably in a range of 0.2% to 50% by mass.

<Optional Component>

The resin composition for forming a phase-separated structure of the present embodiment may contain an optional component other than the above-described block copolymer and organic solvent component.

Examples of the optional component include another resin, surfactant, dissolution inhibitor, plasticizer, stabilizer, colorant, halation-preventing agent, dye, sensitizer, base multiplier, basic compound, and the like.

The resin composition for forming a phase-separated structure according to the present embodiment as described above contains a block copolymer that is formed of a first block, a second block, and a third block, which are bonded to one another, and in the block copolymer, the structure of a constituent unit of a polymer constituting the first block is identical to the structure of a constituent unit of a polymer constituting the third block, and the number-average molecular weight (Mn3) of the polymer constituting the third block is smaller than the number-average molecular weight (Mn1) of the polymer constituting the first block.

A conventional triblock polymer (ABA) that satisfies Mn1=Mn3 and is formed of the A block, the B block, and the A block, which are bonded to one another, has two bonding points for connecting different kinds of block chains. Accordingly, in a microdomain, the molecules in the triblock polymer (ABA) exhibit a bridge-type molecular form in which the bonding points are located at different interfaces and a loop-type molecular form in which the bonding points are located on the same interface. In a case where L0 is the same, one molecule in the triblock polymer (ABA) has a length as long as two molecules of a diblock polymer (AB), so that Mn is doubled. Therefore, in the triblock polymer (ABA), a margin on a guide pitch side where L0 is larger is increased. However, the increase in Mn reduces the thermal motility during annealing, and in a limited process time, phase separation does not sufficiently occur, resulting in the increase in the number of defects.

On the other hand, since the block copolymer contained in the resin composition for forming a phase-separated structure of the present embodiment has Mn3 smaller than Mn1, Mn is not excessively larger than that of the triblock polymer (ABA), and the thermal motility is maintained. Thus, the occurrence of defects can be suppressed while improving the process margin.

(Method of Producing Structure Containing Phase-Separated Structure)

The method of producing a structure containing a phase-separated structure according to the present embodiment includes a step of applying a resin composition for forming a phase-separated structure of the above-described embodiment on a support to form a layer including a block copolymer (hereinafter, referred to as a "step (i)") and a step of phase-separating layer containing the block copolymer (hereinafter, referred to as a "step (ii)").

Hereinafter, such a method of producing a structure containing a phase-separated structure will be described in detail with reference to FIG. 1. However, the present invention is not limited thereto.

FIG. 1 shows an embodiment of the method of producing a structure containing a phase-separated structure.

In the embodiment shown in FIG. 1, first, an undercoat agent layer 2 is formed by applying an undercoat agent on a support 1 ((I) of FIG. 1).

Next, a layer (BCP layer) 3 containing the block copolymer is formed by applying the resin composition for forming a phase-separated structure of the above-described embodiment on the undercoat agent layer 2 ((II) of FIG. 1; hereinabove, step (i)).

Next, the BCP layer 3 is phase-separated into phases **3*a* and phases 3*b* by heating and annealing treatment ((III) of FIG. 1**; step (ii)).

According to the production method of this embodiment, that is, according to the production method including the step (i) and the step (ii), the structure 3' containing the phase-separated structure is produced on the support 1 on which the undercoat agent layer 2 is formed.

[Step (i)]

In the step (i), the BCP layer 3 is formed by applying a resin composition for forming a phase-separated structure on the support 1.

In the embodiment shown in FIG. 1, first, the undercoat agent layer 2 is formed by applying the undercoat agent on the support 1.

By providing the undercoat agent layer 2 on the support 1, a hydrophilic-hydrophobic balance between the surface of the support 1 and the layer (BCP layer) 3 containing the block copolymer is contemplated.

Undercoat Agent:

A resin composition can be used as an undercoat agent.

The resin composition for the undercoat agent can be appropriately selected from the resin compositions known in the related art used for forming a thin film depending on the type of a block constituting the block copolymer.

The resin composition for the undercoat agent may be, for example, a thermopolymerizable resin composition or may be a photosensitive resin composition such as a positive-type resist composition or a negative-type resist composition. A non-polymerizable film formed by applying a compound being a surface treating agent may be used as an undercoat agent layer. For example, a siloxane-based organic monomolecular film formed by applying phenethyltrichlorosilane, octadecyltrichlorosilane, hexamethyldisilazane, or the like as a surface treating agent can also be suitably used as an undercoat agent layer.

As a resin composition for the undercoat agent, for example, a composition including a resin having both styrene and methyl methacrylate as a constituent unit and a compound or a composition including both a site having a high affinity with styrene such as an aromatic ring and a site having a high affinity with methyl methacrylate (such as a highly polar functional group) are preferably used.

As a resin having both styrene and methyl methacrylate as a constituent unit, a random copolymer of styrene and methyl methacrylate, an alternating polymer of styrene and methyl methacrylate (the polymer in which each monomer is alternately copolymerized), and the like are exemplary examples.

In addition, as a composition including both a site having a high affinity with styrene and a site having a high affinity with methyl methacrylate, for example, a composition having a resin obtained by polymerizing at least, as a monomer, a monomer having an aromatic ring and a monomer having a highly polar functional group are exemplary examples. As the monomer having an aromatic ring, a monomer having an aryl group obtained by removing a hydrogen atom from an aromatic hydrocarbon ring, such as a phenyl group, a biphenyl group, a fluorenyl group, a naphthyl group, an anthryl group, and a phenanthryl group, or a heteroaryl group in which carbon atoms constituting the ring of these groups are partially substituted with a heteroatom such as an oxygen atom, a sulfur atom or a nitrogen atom are exemplary examples. In addition, as a monomer having a highly polar functional group, a monomer having a trimethoxysilyl group, a trichlorosilyl group, an epoxy group, a glycidyl group, a carboxy group, a hydroxyl group, a cyano group, a hydroxyalkyl group in which the hydrogen atoms of the alkyl group are partially substituted with a hydroxy group, and the like are exemplary examples.

Furthermore, as a compound including both a site having a high affinity with styrene and a site having a high affinity with methyl methacrylate, a compound including both an aryl group such as phenethyltrichlorosilane and a highly polar functional group, or a compound including both an alkyl group such as an alkylsilane compound and a highly polar functional group, and the like are exemplary examples.

The resin composition for the undercoat agent can be produced by dissolving the above-described resin in a solvent.

As such a solvent, any solvent may be used as long as it can dissolve each component to be used and form a homogeneous solution. For example, the same organic solvent components provided as exemplary examples in the description of the resin composition for forming a phase-separated structure of the above-described embodiment are exemplary examples.

The type of the support 1 is not particularly limited as long as the resin composition can be applied on its surface. For example, a substrate made of an inorganic material such as a metal (silicon, copper, chromium, iron, and aluminum), glass, titanium oxide, silica or mica; a substrate made of an oxide such as $SiO_2$: a substrate made of a nitride such as SiN: a substrate made of an oxynitride such as SiON; and a substrate made of an organic material such as acryl, polystyrene, cellulose, cellulose acetate, phenolic resin, and the like are exemplary examples. Among these, a metal substrate is suitable, and for example, the structure of a lamella structure is likely to be formed in a silicon substrate (Si substrate) or a copper substrate (Cu substrate). Among these, a Si substrate is particularly suitable.

The size and shape of the support 1 are not particularly limited. The support 1 is not necessarily required to have a smooth surface, and substrates of various shapes can be appropriately selected. For example, a substrate having a curved surface, a flat plate having an uneven surface, and a substrate with flaky shape are exemplary examples.

An inorganic and/or organic film may be provided on the surface of the support 1.

As an inorganic film, an inorganic antireflection film (inorganic BARC) can be an exemplary example. As an organic film, an organic antireflection film (organic BARC) is an exemplary example.

The inorganic film can be formed, for example, by applying an inorganic antireflection film composition such as a silicon-based material on a support and by sintering the film, and the like.

For example, the organic film is formed by applying a material for forming an organic film in which a resin component constituting the film is dissolved in an organic solvent on a substrate using a spinner or the like and by sintering the film under heating conditions of preferably 200 °C to 300 °C, and preferably for 30 to 300 seconds and more preferably for 60 to 180 seconds. The material for forming this organic film does not necessarily need to have sensitivity to light or electron beams such as a resist film, and may or may not have sensitivity. Specifically, a resist or a resin generally used for the production of a semiconductor element or a liquid crystal display element can be used.

In addition, it is preferable that the material for forming an organic film is a material capable of forming an organic film which can be subjected to etching, particularly dry-etched so that the organic film can be etched through the pattern which is made of the block copolymer, formed by processing the BCP layer 3 and the pattern can be transferred on the organic film to form an organic film pattern. Among these, a material capable of forming an organic film capable of being subjected to etching such as oxygen plasma etching is preferable. Such a material for forming an organic film may be a material used for forming an organic film such as organic BARC in the related art. For example, the ARC series manufactured by NISSAN CHEMICAL INDUSTRIES, LTD., the AR series manufactured by Rohm and Haas Japan Ltd., and the SWK series manufactured by TOKYO OHKA KOGYO CO., LTD. and the like are exemplary examples.

The method of forming the undercoat agent layer 2 by applying the undercoat agent on the support 1 is not particularly limited, and the undercoat agent layer 2 can be formed by a known method in the related art.

For example, the undercoat agent layer 2 can be formed by applying the undercoat agent on the support 1 by a known method in the related art such as a spin coating or using a spinner to form a coating film, and drying the coating film. As a method of drying the coating film, any method of drying the coating film may be used as long as the solvent included in the undercoat agent can be volatilized, and for example, a method of sintering the coating film can be an exemplary example. In this case, the sintering temperature is preferably 80 °C to 300 °C, more preferably 180 °C to 270 °C, and even more preferably 220 °C to 250 °C. The sintering time is preferably 30 to 500 seconds and more preferably 60 to 400 seconds.

The thickness of the undercoat agent layer 2 after drying the coating film is preferably about 10 to 100 nm and more preferably about 40 to 90 nm.

The surface of the support 1 may be cleaned in advance before forming the undercoat agent layer 2 on the support 1. The coatability of the undercoat agent is improved by cleaning the surface of the support 1.

As the cleaning treatment method, known methods in the related art can be used, and examples thereof include oxygen plasma treatment, ozone oxidation treatment, acid alkali treatment, chemical modification treatment, and the like.

After the undercoat agent layer 2 is formed, the undercoat agent layer 2 may be rinsed with a rinsing liquid such as a solvent, as necessary. Since the uncrosslinked portion of the undercoat agent layer 2 is removed by the rinsing, the affinity with at least one block constituting the block copolymer is improved, and therefore, a phase-separated structure having a lamella structure oriented in the direction perpendicular to the surface of the support 1 is likely to be formed.

The rinsing liquid may be any one as long as it can dissolve the uncrosslinked portion and may be a solvent such as propylene glycol monomethyl ether acetate (PGMEA), propylene glycol monomethyl ether (PGME), ethyl lactate (EL) or a commercially available thinner liquid.

After the cleaning, post-sintering may be performed in order to volatilize the rinsing liquid. The temperature condition of the post-sintering is preferably 80 °C to 300 °C, more preferably 100 °C to 270 °C, and even more preferably 120 °C to 250 °C. The sintering time is preferably 30 to 500 seconds and more preferably 60 to 240 seconds. The thickness of the undercoat agent layer 2 after such post-sintering is preferably about 1 to 10 nm and more preferably about 2 to 7 nm.

Next, the layer (BCP layer) 3 containing the block copolymer is formed on the undercoat agent layer 2. The method of forming the BCP layer 3 on the undercoat agent layer 2 is not particularly limited. For example, a method of forming the BCP layer 3 by applying a resin composition for forming a phase-separated structure of the above-described embodiment on the undercoat agent layer 2 by a known method in the related art such as a spin coating or using a spinner to form a coating film and by drying the coating film is an exemplary example.

The thickness of the BCP layer 3 may be a thickness sufficient to cause phase separation, and the thickness is preferably 20 to 100 nm and more preferably 30 to 80 nm, in consideration of the type of the support 1, the structure period size of the phase-separated structure to be formed, or the uniformity of the nanostructure.

For example, in a case where the support 1 is a Si substrate, the thickness of the BCP layer 3 is preferably adjusted to 10 to 100 nm and more preferably 30 to 80 nm.

[Step (ii)]

In the step (ii), the BCP layer 3 formed on the support 1 is phase-separated.

By heating to perform an annealing treatment of the support 1 after step (i), a phase-separated structure is formed so that at least a part of the surface of the support 1 is exposed by selective removal of the block copolymer. That is, a structure 3' containing a phase-separated structure in which the phases 3*a* and the phases 3*b* are phase-separated is produced on the support 1.

The annealing treatment is preferably performed under the temperature condition of the glass transition temperature of the block copolymer used or higher and lower than the thermal decomposition temperature. For example, in a case where the block copolymer is polystyrene-polymethyl methacrylate (PS-PMMA) block copolymer (weight-average molecular weight of 5,000 to 100,000), the temperature is preferably 180 °C to 270 °C, more preferably 200 °C to 270 °C, and still more preferably 220 °C to 260 °C.

The heating time is preferably 1 minute to 1 hour, more preferably 2 to 45 minutes, and still more preferably 5 to 30 minutes.

In addition, it is preferable that the annealing treatment is performed in a gas having low reactivity such as nitrogen.

In the method for producing a structure containing a phase-separated structure of the embodiment as described above, since the resin composition for forming a phase-separated structure of the above-described embodiment is used, the favorable process margin is ensured.

In addition, according to the structure containing a phase-separated structure of the present embodiment, it is possible to produce a support having nanostructures whose positions and orientations are more freely designed on the surface of the support.

For example, according to the method of producing a structure containing a phase-separated structure of the present embodiment, the formed structure tends to be a phase-separated structure having a lamella structure.

[Optional Step]

The method of producing a structure containing a phase-separated structure is not limited to the above-described embodiment and may have steps (optional steps) in addition to the step (i) and the step (ii).

Examples of this optional step include a step (hereinafter, referred to as a “step (iii)”) of selectively removing a phase composed of at least one block of the blocks constituting the block copolymer in the BCP layer 3, a step of forming a guide pattern, and the like.

Regarding Step (iii)

In the step (iii), the phase composed of at least one block of the blocks constituting the block copolymer in the BCP layer that is formed on the undercoat agent layer 2 is selectively removed. As a result, a fine pattern (polymer nanostructure) is formed.

As the method of selectively removing the phase composed of the blocks, a method of performing oxygen plasma treatment on the BCP layer, a method of performing hydrogen plasma treatment, and the like are exemplary examples.

For example, oxygen plasma treatment, hydrogen plasma treatment, or the like is performed on the BCP layer after the phase separation of the BCP layer containing the block copolymer, thereby removing a phase composed of the second block without selectively removing a phase composed of the first and third blocks.

Figure 2:
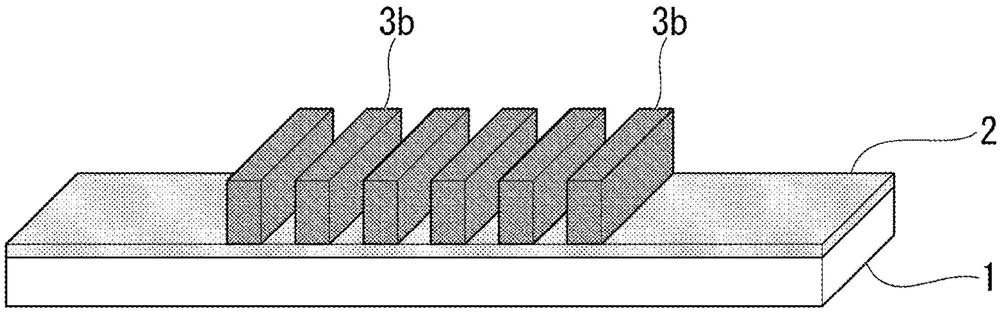
FIG. 2 is a diagram showing an example of an embodiment of an optional step.

FIG. 2 shows an example of an embodiment of the step (iii).

In the embodiment shown in FIG. 2, in a case where the phases 3*a* are selectively removed by performing oxygen plasma treatment on the structure 3' produced on the support 1 in the step (ii) to form a pattern (polymer nanostructure) consisting of the phases 3*b*.

The support 1 on which the pattern is formed by the phase separation of the BCP layer 3 composed of the block copolymer as described above can be used as it is, but the shape of the pattern (polymer nanostructure) of the support 1 may be changed by further heating.

The temperature condition for heating is preferably the glass transition temperature of the block copolymer to be used or higher and is preferably lower than the thermal decomposition temperature. In addition, the heating is preferably performed in a gas having low reactivity such as nitrogen.

Regarding Guide Pattern Forming Step

The method of producing a structure containing a phase-separated structure may also include a step (guide pattern forming step) of forming a guide pattern on the undercoat agent layer. Accordingly, it possible to control the array structure of the phase-separated structure.

For example, in a case where the guide pattern is not provided, even in a block copolymer containing a random fingerprint-shaped phase-separated structure formed, a resist film having a structure with grooves is provided on the surface of the undercoat agent layer to obtain a phase-separated structure oriented along the grooves. According to such a principle, the guide pattern may be provided on the undercoat agent layer 2. In addition, a surface of the guide pattern has an affinity with any of the blocks constituting the block copolymer, so that a phase-separated structure having a lamella structure oriented in the direction perpendicular to the surface of the support is likely to be formed.

The guide pattern can be formed by, for example, using a resist composition.

As the resist composition for forming the guide pattern, generally, those having the affinity with any of the blocks constituting the block copolymer can be appropriately selected for use from resist compositions used for forming resist patterns or modified products thereof. The resist composition may be any of a positive-type resist composition for forming a positive-type pattern in which exposed areas of a resist film is dissolved and removed or a negative-type resist composition for forming a negative-type pattern in which unexposed areas of a resist film is dissolved and removed, and the resist composition is preferably a negative-type resist composition. The negative-type resist composition is preferably, for example, a resist composition containing an acid generator, and a base material component whose solubility into a developer containing an organic solvent is reduced by the action of an acid, and the base material component contains a resin component having a constituent unit which is decomposed by the action of an acid to increase the polarity.

The resin composition for forming a phase-separated structure is poured on the undercoat agent layer on which the guide pattern is formed, and thereafter, the annealing treatment is performed to cause phase separation. Therefore, as the resist composition for forming the guide pattern, a resist composition that can form a resist film excellent in solvent resistance and heat resistance is preferred.

(Block Copolymer)

The block copolymer according to the present embodiment is formed of the first block, the second block, and the third block, which are bonded to one another, and in the block copolymer, the structure of the constituent unit of the polymer constituting the first block is identical to the structure of the constituent unit of the polymer constituting the third block, and the number-average molecular weight of the polymer constituting the third block is smaller than the number-average molecular weight of the polymer constituting the first block.

In the block copolymer, the first block and the third block are preferably composed of a polymer having a repeating structure composed of a constituent unit containing an aromatic hydrocarbon group, and the second block is preferably composed of a polymer having a repeating structure composed of a constituent unit derived from an (α-substituted) acrylic acid ester.

The block copolymer of the present embodiment is the same block copolymer as in the above-described resin composition for forming a phase-separated structure.

From the viewpoint that the process margin during the formation of the structure can be further improved, the block copolymer according to the present embodiment is a block copolymer suitable to be used in the method of producing a structure containing a phase-separated structure (block copolymer for forming a phase-separated structure).

<Method of Producing Block Copolymer>

The block copolymer in the present embodiment can be produced by a known method.

For example, a monomer from which the constituent unit of the polymer constituting the first block is derived, a monomer from which the constituent unit of the polymer constituting the second block is derived, and a monomer from which the constituent unit of the polymer constituting the third block is derived can be subjected to living polymerization to obtain the block copolymer in the present embodiment.

On the other hand, for example, in a case where styrene and methyl methacrylate are used as the monomer, the block copolymer can be produced by a production method including the following steps (steps A and B).

Step A: A step of polymerizing styrene and methyl methacrylate to obtain a block copolymer (PS-b-PMMA)

Step B: A step of carrying out a transesterification reaction between the block copolymer (PS-b-PMMA) obtained in the step A and polystyrene having a hydroxy group at the terminal of the main chain Step A:

Living polymerization is preferable as the polymerization of styrene and methyl methacrylate, because the block copolymer (PS-b-PMMA) can be easily obtained.

Examples of the preferable living polymerization methods include living anionic polymerization and living radical polymerization, and living anionic polymerization is particularly preferred because the narrow dispersion is further contemplated.

Step B:

Examples of the polystyrene having a hydroxy group at the terminal of the main chain in the step B include a compound represented by Formula (PS-OH).

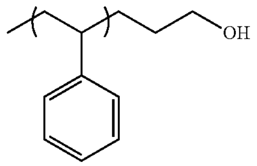

(PS-OH)

The step B may be carried out in the presence of a base catalyst.

Specific examples of the base catalyst include 1,5,7-triazabicyclo[4.4.0]deca-5-en (TBD) and the like.

The reaction temperature in the step B is preferably 50 °C to 200 °C and more preferably 80 °C to 180 °C.

The reaction time in the step B is preferably 10 to 300 hours.

EXAMPLES

Hereinafter, the present invention will be described in more detail based on examples, but the present invention is not limited to the following examples.

<Synthesis Example of Block Copolymer>

Block copolymers (BCP1 to 10) contained in resin compositions for forming a phase-separated structure of Examples 1 to 10 were synthesized by the following method. Mn and a copolymerization composition ratio (PS/PMMA) in each of a block copolymer (PS-b-PMMA) containing a block composed of styrene and a block composed of methyl methacrylate used to synthesize BCP 1 to 10, and a compound represented by Formula (PS-OH) are as shown in Table 2.

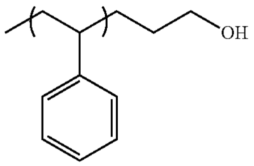

(PS-OH)

To a flask (30 mL) with a greaseless valve, a stirrer was put, and 500 mg of PS-b-PMMA and the compound represented by Formula (PS-OH) were added in the amounts shown in Table 1, and the resulting mixture was vacuumed at 100 °C in an aluminum bath and dried overnight. After drying, 5 mg (0.0357 mmol) of TBD dissolved in 5 mL of toluene was added to the flask, and the resulting mixture was stirred at 150 °C in the aluminum bath. After stirring, the mixture was cooled to room temperature, and about 5 mg of benzoic acid was then added. Reprecipitation was performed with MeOH at room temperature, and vacuum drying was carried out. A sample (only 300 mg) was dispersed in cyclohexane, stirred at 75 °C for 15 minutes, and centrifuged to remove the solvent. This step was carried out three times. After centrifugation, reprecipitation and vacuum drying were carried out to synthesize each block copolymer (PS-b-PMMA-b-PS').

TABLE 1

| | Adding amount of PS-b-PMMA [mg] | Adding amount of PS—OH [mg] |
|---|---|---|
| Example 1 | 500 | 119 |
| Example 2 | 500 | 298 |
| Example 3 | 500 | 99 |
| Example 4 | 500 | 247 |
| Example 5 | 500 | 247 |
| Example 6 | 500 | 407 |
| Example 7 | 500 | 179 |
| Example 8 | 500 | 179 |
| Example 9 | 500 | 119 |
| Example 10 | 500 | 298 |
| Comparative Example 1 | 500 | 0 |
| Comparative Example 2 | 500 | 0 |
| Comparative Example 3 | 500 | 0 |
| Comparative Example 4 | 500 | 0 |
| Comparative Example 5 | 500 | 0 |

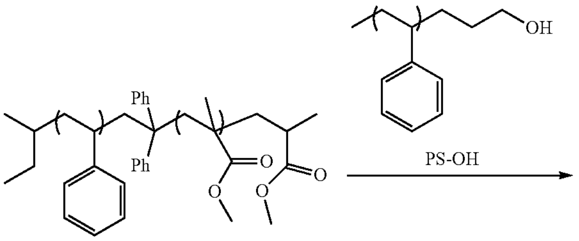

PS-b-PMMA

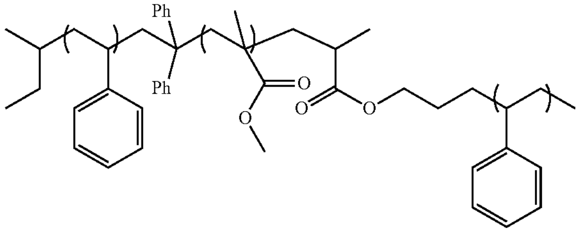

PS-b-PMMA-b-PS'

<Preparation of Resin Composition for Forming Phase-separated Structure>

Each block copolymer was dissolved in propylene glycol monomethyl ether acetate (PGMEA) and mixed to prepare a resin composition for forming a phase-separated structure (solid content concentration of 1.3% by mass) in each example.

Each of the block copolymers used in Comparative Examples 1 to 4 was PS-b-PMMA containing only the first block and the second block, and the block copolymer used in Comparative Example 5 was a block copolymer (PS-b-PMMA-b-PS) containing the first block and third block, of which the structures and molecular weights were the same as each other.

The Mn of (PS-b-PMMA-b-PS') shown in Table 2 is the number-average molecular weight in terms of standard polystyrene measured by size-exclusion chromatography.

The PS' substitution rate was calculated from Mn of (PS-b-PMMA) used as a raw material and Mn of (PS-b-PMMA-b-PS') described above. In a case where the substitution rate is more than 100%, the transesterification occurs on not only the PMAA terminal of PS-b-PMMA but also between the constituent unit derived from methyl methacrylate in the PMMA block and PS-OH.

The copolymerization composition ratio of (PS-b-PMMA-b-PS') shown in Table 2 was calculated by $^{1}$H-NMR.

TABLE 2

| | Block | PS-b-PMMA | | PS' | PS' substitution rate | PS-b-PMMA-b-PS' | |
|---|---|---|---|---|---|---|---|
| | copolymer | Mn | PS/PMMA | Mn | (%) | Mn | PS/PMMA |
| Example 1 | BCP1 | 42000 | 50/50 | 2000 | 110 | 44000 | 52/48 |
| Example 2 | BCP2 | 42000 | 50/50 | 5000 | 114 | 48000 | 55/45 |
| Example 3 | BCP3 | 50000 | 50/50 | 2000 | 98 | 52000 | 52/48 |
| Example 4 | BCP4 | 50000 | 50/50 | 5000 | 92 | 55000 | 54/46 |
| Example 5 | BCP5 | 50000 | 50/50 | 5000 | 130 | 57000 | 56/44 |
| Example 6 | BCP6 | 62000 | 45/55 | 10000 | 109 | 73000 | 53/47 |
| Example 7 | BCP7 | 70000 | 50/50 | 5000 | 105 | 75000 | 53/47 |
| Example 8 | BCP8 | 70000 | 50/50 | 5000 | 132 | 77000 | 54/46 |
| Example 9 | BCP9 | 42000 | 50/50 | 2000 | 160 | 45000 | 54/46 |
| Example 10 | BCP10 | 42000 | 50/50 | 5000 | 176 | 51000 | 59/41 |

TABLE 3

| | PS-b-PMMA | | PS' | PS' substitution rate | PS-b-PMMA-b-PS | |
|---|---|---|---|---|---|---|
| | Mn | PS/PMMA | Mn | (%) | Mn | PS/PMMA |
| Comparative Example 1 | 42000 | 50/50 | — | — | — | — |
| Comparative Example 2 | 50000 | 50/50 | — | — | — | — |
| Comparative Example 3 | 62000 | 45/55 | — | — | — | — |
| Comparative Example 4 | 70000 | 50/50 | — | — | — | — |
| Comparative Example 5 | PS-b-PMMA-b-PS | | | | 88000 | 50/50 |

[Evaluation of Period (L0) of Structure]

A neutralized film resin composition (styrene/methyl methacrylate/2-hydroxyethyl methacrylate=82/12/6) adjusted by a PGMEA solution having a concentration of 2 wt % was applied onto a 12-inch silicon wafer using a spinner, sintered at 250 °C for 300 seconds, and dried to form a layer formed of a neutralized film having a film thickness of 60 nm on a substrate.

Next, a portion of the neutralized film excluding a portion with which the substrate is in close contact was removed with a solvent OK73 thinner (manufactured by TOKYO OHKA KOGYO CO., LTD.) and post-baked at 100 °C for 60 seconds, and the resin composition for purifying a phase-separated structure in each example was applied onto the layer formed of the neutralized film by spin-coat and soft-baked at 90 °C for 60 seconds to form a BCP layer having a film thickness of 35 nm.

This substrate was heated at 250 °C for 30 minutes under a nitrogen stream and annealed to form a structure containing a phase-separated structure. Thereafter, a selective block removal treatment was carried out to form a Finger print pattern. The formed pattern was imaged using a critical dimension scanning electron microscope CG6300 manufactured by Hitachi High-Tech Corporation. 100 images acquired were analyzed with DSA-APPS of image analysis software manufactured by Hitachi High-Tech Corporation, and the average value of L0s of the 100 images calculated was obtained. The results are shown in Tables 4 to 5 in the columns of "L0 (nm)". In addition, the shapes of the phase-separated structures are shown in Tables 4 and 5 as "Shape".

[Evaluation of Process Margin]

A polystyrenated film resin composition (styrene/vinylbenzocyclobutene) adjusted by a PGMEA solution having a concentration of 0.4 wt % was applied onto a 12-inch silicon wafer on which silicon nitride was formed as an antireflection film using a spinner, sintered at 250 °C for 300 seconds, and dried to form a layer formed of a polystyrenated film having a film thickness of 8 nm on a substrate.

Thereafter, an ArF photoresist for liquid immersion was applied thereto and baked at 90 °C for 60 seconds.

Exposure was carried out using an ArF liquid immersion lithography machine (ASML NXT1900i scanner, NA: 1.35, quadrupole, 0.87, 0.72), and post-exposure sintering was carried out at 110 °C for 60 seconds.

After development, a pattern of the polystyrenated film was formed by plasma etching using an oxygen/nitrogen system, subsequent resist stripping, and post sintering at 100 °C for 60 seconds. Thereafter, a neutralized film resin composition (styrene/methyl methacrylate/hydroxyethyl methacrylate) adjusted by a 2 wt % PGMEA solution was applied, baked at 250 °C for 300 seconds, rinsed with OK73 thinner, and post-baked at 100 °C for 60 seconds, thereby producing an evaluation guide substrate.

The obtained guide substrate was divided into small pieces for each repeating pattern and used for evaluation.

The resin composition for purifying a phase-separated structure in each example was applied to a guide substrate, baked at 90 °C for 60 seconds, and then annealed at 250 °C for 30 minutes to form a phase separation pattern.

Thereafter, irregularities were formed on a surface by oxygen plasma ashing, platinum vapor deposition was then carried out, and SEM observation was carried out with SU8000. The number of cells having no defect in 96 cells was confirmed using a guide given random guide pitch (X direction) and guide dimension (Y direction). The increase in the number of cells having no defects means that one block copolymer can be used for a plurality of pitches. The results are shown in Tables 4 and 5 as "Process Margin".

TABLE 4

| | L0 [nm] | Shape | Process margin |
|---|---|---|---|
| Example 1 | 22.3 | Perpendicular lamellar | 32 |
| Example 2 | 22.2 | Perpendicular lamellar | 35 |
| Example 3 | 25.2 | Perpendicular lamellar | 30 |
| Example 4 | 23.2 | Perpendicular lamellar | 45 |
| Example 5 | 22.3 | Perpendicular lamellar | 37 |
| Example 6 | 24.5 | Perpendicular lamellar | 39 |
| Example 7 | 30.2 | Perpendicular lamellar | 32 |
| Example 8 | 28.5 | Perpendicular lamellar | 34 |
| Example 9 | 20.9 | Perpendicular lamellar | 32 |
| Example 10 | 19.9 | Perpendicular lamellar | 30 |

TABLE 5

| | L0 [nm] | Shape | Process margin |
|---|---|---|---|
| Comparative Example 1 | 22.8 | Perpendicular lamellar | 24 |
| Comparative Example 2 | 26.2 | Perpendicular lamellar | 24 |
| Comparative Example 3 | 29.1 | Perpendicular lamellar | 25 |
| Comparative Example 4 | 33.0 | Perpendicular lamellar | 26 |
| Comparative Example 5 | 23.9 | Perpendicular lamellar | 0 |

As shown in Tables 4 and 5, it could be confirmed that each resin composition for forming a phase-separated structure in Examples had a more favorable process margin than each resin compositions for forming a phase-separated structure in Comparative Examples.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. A block copolymer comprising:

a first block, a second block, and a third block, which are bonded to one another, wherein a structure of a constituent unit of a polymer constituting the first block is identical to a structure of a constituent unit of a polymer constituting the third block, and a number-average molecular weight of the polymer constituting the third block is smaller than a number-average molecular weight of the polymer constituting the first block, the first block and the third block comprise a polymer having a repeating structure comprising a constituent unit containing an aromatic hydrocarbon group, the second block comprises a polymer having a repeating structure comprising a constituent unit derived from an acrylic acid ester optionally having a hydrogen atom bonded to the carbon atom at the α-position of the acrylic acid ester substituted with a substituent, and a ratio Mn1:Mn3 of the number-average molecular weight Mn1 of the polymer constituting the first block to the number-average molecular weight Mn3 of the polymer constituting the third block is 1:0.05 to 1:0.35.

2. A block copolymer comprising:

a first block, a second block, and a third block, which are bonded to one another, wherein a structure of a constituent unit of a polymer constituting the first block is identical to a structure of a constituent unit of a polymer constituting the third block, a number-average molecular weight of the polymer constituting the third block is smaller than a number-average molecular weight of the polymer constituting the first block, the first block and the third block comprise a polymer having a repeating structure composed of a constituent unit containing an aromatic hydrocarbon group, the second block comprises a polymer having a repeating structure comprising a constituent unit derived from an acrylic acid ester optionally having a hydrogen atom bonded to the carbon atom at the α-position of the acrylic acid ester substituted with a substituent, and a mass ratio of the first block and third block to the second block is 25:75 to 75:25.

3. A block copolymer comprising:

a first block, a second block, and a third block, which are bonded to one another, wherein a structure of a constituent unit of a polymer constituting the first block is identical to a structure of a constituent unit of a polymer constituting the third block, a number-average molecular weight of the polymer constituting the third block is smaller than a number-average molecular weight of the polymer constituting the first block, and the block copolymer contains the third block bonded to a side chain of the second block via a linking group.

4. The block copolymer according to claim 3, wherein the first block and the third block comprise a polymer having a repeating structure comprising a constituent unit containing an aromatic hydrocarbon group, and the second block comprises a polymer having a repeating structure comprising a constituent unit derived from an acrylic acid ester optionally having a hydrogen atom bonded to the carbon atom at the α-position of the acrylic acid ester substituted with a substituent.

5. A resin composition for forming a phase-separated structure comprising the block copolymer according to claim 1.

6. A resin composition for forming a phase-separated structure comprising the block copolymer according to claim 2.

7. A resin composition for forming a phase-separated structure comprising the block copolymer according to claim 3.

* * * * *